United States Patent [19]

Larsson et al.

[11] Patent Number: 4,518,819

[45] Date of Patent: May 21, 1985

[54] CLAMP ASSEMBLY FOR POWER CABLES

[75] Inventors: Peter L. Larsson, Mountain View; Robin J. T. Clabburn, Menlo Park, both of Calif.

[73] Assignee: Raychem Corporation, Menlo Park, Calif.

[21] Appl. No.: 532,081

[22] Filed: Sep. 12, 1983

Related U.S. Application Data

[63] Continuation of Ser. No. 288,427, Jul. 30, 1981, abandoned.

[51] Int. Cl.³ .................... H02G 15/08; H02G 1/14
[52] U.S. Cl. .............................. 174/78; 29/857; 29/868; 174/89; 174/DIG. 8
[58] Field of Search .................... 174/78, 89, DIG. 8; 29/857, 859, 868, 871

[56] References Cited

U.S. PATENT DOCUMENTS

| | | | |
|---|---|---|---|
| 1,647,699 | 11/1927 | Hoeftmann . | |
| 2,027,962 | 1/1936 | Currie | 174/DIG. 8 |
| 3,086,242 | 4/1963 | Cook et al. | 425/326.1 X |
| 3,455,336 | 7/1969 | Ellis | 138/158 |
| 3,777,048 | 12/1973 | Traut | 174/84 R X |
| 3,887,895 | 6/1975 | Pierzchala | 174/78 X |
| 3,968,015 | 7/1976 | Nyberg | 174/DIG. 8 |
| 4,032,205 | 6/1977 | Taj | 174/78 X |
| 4,070,746 | 1/1978 | Evans | 174/DIG. 8 |
| 4,092,488 | 5/1978 | Hayami et al. | 174/84 R |
| 4,135,553 | 1/1979 | Evans | 174/84 S X |
| 4,181,775 | 1/1980 | Corke | 174/DIG. 8 X |
| 4,273,953 | 6/1981 | Guzy | 29/871 X |
| 4,282,397 | 8/1981 | Siedenburg et al. | 428/36 |
| 4,383,131 | 5/1983 | Clabburn | 174/DIG. 8 X |
| 4,426,413 | 1/1984 | Fentress | 174/DIG. 8 X |
| 4,427,262 | 1/1984 | Oldham | 174/89 X |

FOREIGN PATENT DOCUMENTS

| | | |
|---|---|---|
| 1930655 | 1/1970 | Fed. Rep. of Germany ........ 174/92 |
| 2323167 | 11/1974 | Fed. Rep. of Germany . |
| 1966933 | 6/1975 | Fed. Rep. of Germany ... 174/DIG. 8 |
| 12146 | of 1910 | United Kingdom . |
| 229506 | 2/1925 | United Kingdom ................. 174/89 |
| 1470049 | 4/1977 | United Kingdom . |
| 2005091 | 4/1979 | United Kingdom . |

Primary Examiner—A. T. Grimley
Assistant Examiner—Morris H. Nimmo
Attorney, Agent, or Firm—Edith A. Rice; Herbert G. Burkard

[57] ABSTRACT

This invention relates to a clamp assembly for connecting the metal armor, screen or shielding of one power cable of a joint connecting two or more power cables, with a metal bridging element which spans the joint and is connected to the metal armor, screen or shielding of the other power cable or cables of the joint. The clamp assembly comprises a hollow metal cylinder, means for sealing the cylinder to the inner sheath of the power cable and first and second clamping means for securing the metal armor, screen or shielding of the cable and for securing the metal bridging element to the metal cylinder. The metal bridging element can be a part of a protective joint enclosure placed over the joint area.

22 Claims, 1 Drawing Figure

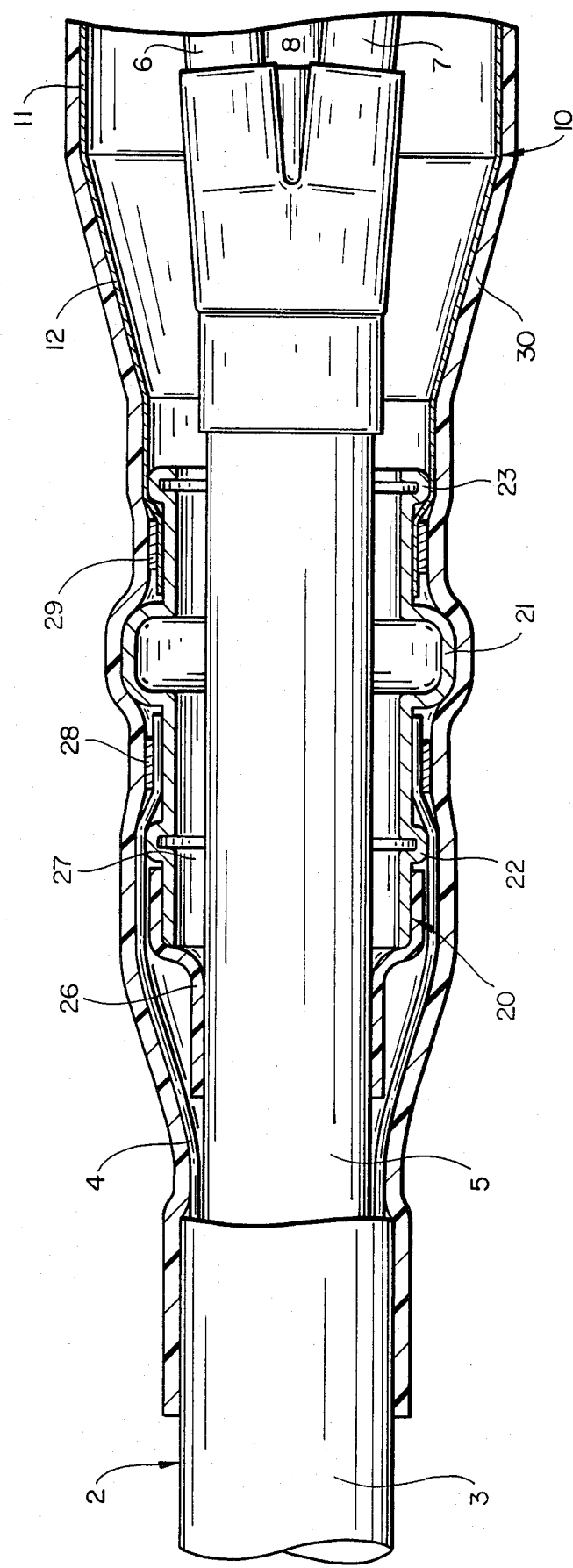
FIG_1

CLAMP ASSEMBLY FOR POWER CABLES

This application is a continuation, of application Ser. No. 288,427, filed July 30, 1981.

BACKGROUND OF THE INVENTION

This invention relates to a clamp assembly for use with power cables, and more particularly with a clamp assembly for connecting the metal armor, screen or shielding of a power cable to a metal bridging element which spans the joint and is connected to the metal armor, screen or shielding of another power cable of the joint. This invention also relates to a method of protecting a joint between power cables using a joint case having a continuous metal element, a dimensionally-recoverable polymeric sleeve and said clamp assembly.

Electric power cables are of two general types, paper insulated and polymer insulated. Paper insulated cable comprises an inner core containing, usually, three or four current carrying conductors. The conductors are insulated from each other and are surrounded by an insulation comprising oil impregnated paper. A metal sheath, generally of lead or aluminum, surrounds the insulation to protect the core from moisture. Surrounding the metal sheath is a layer of armor which provides longitudinal strength and mechanically protects the metal sheath. The armor is made of metal, generally steel or aluminum and can be in the form of wires, sheet or tape. The armor and metal sheath may be required to carry significant earth fault currents. The armor is provided with additional outer protection, which typically is a bitumen/hessian combustion, but which can also be a polymeric layer such as polyvinyl chloride. Where bitumen/hessian are used as outer protection, this layer does not effectively prevent water, after long periods in service, from penetrating through to the armor layer and then wicking down the individual metal components (or layers). The oil impregnated paper insulation is particularly sensitive to water and where the lead or aluminum sheath is removed, such as when a joint between power cables is made, steps must be taken to prevent water coming into contact with the insulation and/or conductors of the core.

A polymer insulated cable consists of one or more insulated conductors. The conductors may be solid metal or of stranded construction and are typically of copper or aluminum. The insulating polymer is typically cross-linked polyethylene, polyvinyl chloride or ethylenepropylene rubber and is generally applied by extrusion. Individual insulated conductors are known as cores. Numbers or cores are layed together to form a cable. Most commonly, polymer insulated power cables contain one, three or four cores. For practical purposes, the cores of low voltage power cables require additional protection which usually consists of one or more outer plastic sheaths applied by extrusion and metal wires of tapes wrapped around the layered cores and directly beneath the outer protective jacket. Depending on their size, type and the construction of the cable, these metal wires or tapes are known as screening or armoring. In some cases, these metal components are embedded in a compound to prevent the progress of moisture along individual strands.

Higher voltage polymer insulated power cables are of essentially similar construction but with minor, but nonetheless, significant differences. The core insulation is typically thicker, of high quality and each core is surrounded by its own screen. These core screens vary widely, depending on manufacturer and user requirements and may consist of the following used separately or in combination: copper wires or tapes, carbon black impregnated fabric tapes, extruded low resistance plastic tapes, conductive coatings applied to the surface of the core insulation by extrusion, dispersion coating and the like.

Various combinations of armor, screen, insulation etc. are possible and a variety of power cables are used. Power cables are connected together making a joint. A joint may consist of one cable jointed to at least one other power cable. In making the joint, the various layers of insulation, metal sheath, armor, shielding, etc. are removed from the ends of conductors to be joined. The area of the joint must be protected from the environment, particularly from moisture ingress after the joint has been made. It is also necessary to interconnect the metal armor, screen or shielding of the power cables of the joint.

In the past, the joint area has been protected by placing a joint case, generally a metal box, around the joint. The metal box is sealed and electrically connected to the metal sheath of the cable and the metal armor, screen or shielding using solder. The joint case is filled with a potting composition, usually bitumen or certain curable resin systems which are known in the art. The metal joint case is usually of lead, steel, tinned copper or cast iron and provides a fault current path across the joint as well as protection from moisture ingress. Joint cases of molded plastic can also be used. In this case, a metal braid is soldered to the metal armor, screen or shielding of one cable of the joint, extends across the joint and is connected to the other cable to provide a fault current path across the joint.

A new joint case for power cables is described in U.S. Pat. No. 4,282,397 of Siedenburg and Fritsche 5. This splice case comprises a hollow relatively rigid cylindrical shell having a longitudinal split along its length so that it can be wrapped around an already formed joint. The shell is preferably of metal and has a polymer sheet bonded to its external surface. The shell has tapered end regions formed of prongs or fingers. When the case is used to protect a joint between power cables, the tapered ends of the shell are soldered to the lead or aluminum sheath of the power cable. The metal armor, screen or shielding is also soldered to the metal sheath, preferably at the same points so that only one solder joint is required at each end. A fault current path is thus provided across the joint by the metal shell of the joint case as it is electrically connected to the jointed cables. The assembly is environmentally sealed with a dimensionally recoverable sleeve extending over the joint case or by two shorter sleeves over the tapered end regions.

In the methods described above, a metal braid and/or the joint case is soldered to the metal sheath of the cable, as is the metal armor, screen or shielding. Such a solder connection is difficult to achieve in the field and requires a high level of skill to be successfully completed.

Another approach taken in the art to connect a metal bridging element to the metal armor, screen or shielding of a power cable is the provision of two metal rings which encircle the cable and can be fastened together, for example, by bolts or screws. The ends of the armor and metal element are placed between the two rings which are then fastened together. A metal braid can be soldered to the lead or aluminum sheath of the cable, if present, and positioned between the rings to provide electrical connection to such sheath. This electrically and mechanically connects the armor, screen or shielding and the metal bridging element. Such a system is generally used with polymer insulated electrical cables used at low voltages, i.e. below one thousand volts. Its use has been limited to polymer insulated cables because of their relative insensitivity to moisture ingress. The use of the metal rings to clamp the armor and the metal bridging element does not provide a seal to prevent water from wicking along the armor and entering the joint area, a situation which could be detrimental to paper insulated cables.

In U.K. Patent Specification No. 2,005,091 to BICC Limited a method of terminating wire-armored lead sheathed paper insulated power cables is disclosed. The method uses a complex gland member for clamping the armor wires of the cable. The gland provides only one clamping area and thus is generally used for terminating armored power cables. It would be unsuitable for use to connect the armor of power cables at a joint between cables without additional complex components. The gland is electrically connected to the lead sheath of the power cable by use of a composite heat-recoverable tube having an inner sleeve of metal which softens at the recovery temperature of an outer tube. The gland is of complex structure and is difficult to install in the field.

SUMMARY OF THE INVENTION

This invention provides a clamp assembly for making an electrical connection between the metal armor, screen or shielding of a power cable jointed to at least one other power cable and a metal bridging element which spans the joint. Use of the assembly results in an electrical connection with good mechanical strength and provides an environmental seal preventing water wicking along the armor layer from penetrating into the joint. Furthermore, the assembly is relatively simple and easy to install in the field. Thus, this invention provides an assembly for connecting the metal armor, screen or shielding of jointed power cables which overcomes the disadvantages of the prior art and in particular does not require the use of solder to make the connection.

One aspect of this invention comprises an assembly for connecting the metal armor, screen or shielding of a power cable to a metal bridging element which spans a joint between the power cable and at least one other power cable, the power cable comprising a core, a sheath surrounding said core, metal armor, screen or shielding surrounding the sheath and an outer insulating layer; said assembly comprising:

(a) a hollow metal cylinder having two end portions and a center portion and an internal diameter greater than the diameter of said cable;

(b) means for sealing one end portion of said cylinder to the sheath surrounding the core of said cable;

(c) a first clamping means for securing the metal armor, screen or shielding to said cylinder; and (d) a second clamping means for securing one end of said metal bridging element to said cylinder.

The invention also provides a method of connecting the metal armor, screen or shielding of a power cable to a metal bridging element which spans a joint between the power cable and at least one other power cable using said clamp assembly.

Another aspect of this invention comprises a method of protecting a joint between power cables, each said cable comprising an inner core surrounded by a sheath, metal armor, screen or shielding and an outer insulating layer, which comprises:

(a) positioning over the end of at least one of said cables, a metal cylinder having two end portions and a center portion and an internal diameter greater than the diameter of said cable;

(b) placing around the joint, a joint case having a continuous metal element extending the length of said joint case;

(c) sealing said cylinder to the sheath surrounding the core of said cable;

(d) clamping said metal armor, screen or shielding to said cylinder;

(e) clamping one end of the metal element of said joint case to said cylinder;

(f) placing a dimensionally recoverable polymeric sleeve over at least a portion of said joint case, said metal cylinder and the end of said cable; and (g) causing the sleeve to recover into contact with and sealing to said joint case, said cylinder and said cable.

BRIEF DESCRIPTION OF THE DRAWING

FIG. 1 shows an assembly of this invention connecting the armor of an armored power cable to a joint case installed to connect one end of a joint case having a metal shell with tapered end regions.

DETAILED DESCRIPTION OF THE INVENTION

The clamp assembly of this invention comprises a metal cylinder; means for sealing the cylinder to the sheath surrounding the core of a power cable; clamping means for clamping the metal armor, screen or shielding of the cable to the metal cylinder; and means for clamping a metal bridging element which spans a joint between the power cable and at least one other power cable, to the metal cylinder.

The metal cylinder has an internal diameter greater than the diameter of the cable with which it is to be used. The cylinder is slipped over the end of the cable prior to the joint being made between the cable and at least one other power cable. The cylinder can have smooth inner and outer surfaces or can have raised portions as shown in the accompanying drawing. The metal armor, screen or shielding of the cable and the metal bridging element are preferably clamped to the cylinder in spaced apart relationship such that the center portion of the surface of the cylinder remains clear. This surface provides a sealing surface for a dimensionally recoverable sleeve which is later positioned over the clamp assembly and recovered and sealed thereto. The center sealing surface can be raised which assures contact between the cylinder and the recovered sleeve. This seal prevents water wicking along the metal armor, screen or shielding from progressing across the cylinder and into the joint.

The cylinder is made of metal such as aluminum, steel, galvanized steel, or the like. The cylinder can be produced by conventional metal working techniques. For example, the cylinder can be formed by casting, machining, spinning or the like.

One end of the cylinder is sealed to the sheath surrounding the core of the cable. Suitable sealing means includes tape, such as mastic tape, a polymeric sleeve or the like. The polymeric sleeve can be a dimensionally recoverable sleeve which is positioned over one end portion of the cylinder and the inner sheath of the cable and then caused to recover into contact with the cylinder and sheath. The sleeve can be coated with an adhesive or sealant which provides a water-tight seal between the sleeve and the cable and cylinder. For example, the sleeve can be a heat-shrinkable sleeve coated on the inner surface thereof with mastic or a heat-activatable adhesive, such as a hot melt adhesive. On heating of the sleeve it shrinks into contact with the cable and cylinder and is bonded to them by the mastic or adhesive. Heat-shrinkable sleeves are well known. For example, see U.S. Pat. No. 2,027,962 to Currie and U.S. Pat. No. 3,086,242 to Cook, the disclosures of which are incorporated herein by reference. Other dimensionally recoverable sleeves such as those described in U.S. Pat. Nos. 4,070,746 and 4,135,553 to Evans et al can be used.

A first clamping means secures the metal armor, screen or shielding of the cable to the cylinder. As discussed above, several types of armor are used in electric power cables including, armor wires, armor tape and interlocking armor. Power cables which do not contain armor but contain metal screen or other shielding can also be used with the clamp assembly of this invention. The armor, screen or shielding is clamped to the metal cylinder by any suitable means, for example, hose clamps and the like can be used. The armor, screen or shielding can be bent back over the clamping means to improve mechanical strength of the assembled clamp. The cylinder can be provided with raised portions such that the metal armor, screen or shielding is clamped to the cylinder beyond the raised portion and thus cannot readily be pulled away from the clamping means.

A second clamping means secures a metal bridging element to the metal cylinder. The metal bridging element spans the joint between the power cable and at least one other power cable and is secured to the other power cable. The metal bridging element can be a metal braid, rod or the like or can be a part of the joint case or joint enclosure which covers the joint area. The metal bridging element can be, for example, a joint case such as that disclosed in above mentioned U.S. Pat. No. 4,282,397 of Siedenburg and Fritsche, the disclosure of which is incorporated herein by reference. The clamp assembly can be used with other joint enclosures.

When used with a power cable which has an inner metallic sheath, such as lead or aluminum, the metal sheath can be electrically connected to the metal cylinder and the metal bridging element by soldering a metal braid, for example, to the lead sheath and then clamping the braid to cylinder and metal bridging element by the second clamping means.

The clamp assembly is covered with an outer protective layer. This can be provided by a dimensionally recoverable sleeve such as those described above. The sleeve can be one which encloses the entire joint area or can be a shorter sleeve which covers the clamp assembly of this invention and is sealed to the adjacent cable and the joint case used to protect the joint. The dimensionally recoverable sleeve can be a wraparound sleeve, such as that disclosed in U.S. Pat. No. 3,455,336 of Ellis, the disclosure of which is incorporated herein by reference.

The invention is more fully illustrated with reference to a preferred embodiment illustrated in the accompanying drawing. It is to be understood that other embodiments are possible, as will be apparent to one skilled in the art.

FIG. 1 shows a portion of a joint between power cables. Armored power cable, 2, is jointed to at least one other power cable, not shown. The other power cable need not be the same type as cable, 2, but can be armored or wraparound, paper insulated or polymer insulated.

In the drawing, the power cable, 2, has an outer polymeric jacket, 3, which has been removed from the end of the cable exposing the underlying armor, 4. While not evident in the drawing, armor, 4, comprises armor wires forming a layer encircling the cable. The armor wires, 4, have been removed from the end of the cable, 2, and displaced from the lead sheath, 5, for a distance from the end of the cable to permit installation of the clamp assembly. The lead sheath, 5, surrounds the core of the cable containing the conductors, 6, 7 and 8, which carry the electric current. Conductors, 6, 7 and 8, are jointed to similar conductors of at least one other power cable (not shown). The term "joint area" as used herein refers to the area between the cables from the outer polymeric jacket, 3, of the cable shown to the outer polymeric jacket of the other cable of the joint.

The clamp assembly of this invention includes a hollow metal cylinder, 20. In use the cylinder is positioned over the exposed lead sheath, 5, of the power cable, 2. The metal cylinder in this embodiment is of galvanized steel. The hollow unitary metal cylinder can have smooth surfaces or can have raised sections as shown in the Figure. The cylinder, 20, in the Figure has a raised center portion, 21, and two smaller raised portions or protuberances, 22 and 23, one on each side of the center portion.

The hollow metal cylinder, 20, is sealed to the underlying lead sheath, 5. In the illustrated embodiment, the cylinder, 20, is sealed to the lead sheath, 5, by a polymeric sleeve, 26, with air space, 27, being between the cylinder, 20, and the lead sheath, 5. The polymeric sleeve, 26, is installed by positioning a dimensionally recoverable sleeve over the end section of the cylinder, 20, and adjacent the lead sheath, 5. The sleeve, 26, is then caused to dimensionally recover into intimate contact with the cylinder, 20, and lead sheath, 5. The inner surface of the sleeve, 26, is coated with adhesive and upon recovery is bonded to the underlying cylinder, 20, and lead sheath, 5. The polymeric sleeve, 26, can be of polyethylene and in this use is cross-linked polyethylene. Other polymeric materials can be used in making dimensionally recoverable sleeves as disclosed in above mentioned U.S. Pat. Nos. 2,027,962, 3,086,242, 4,070,746 and 4,135,553.

A joint case, 10, is positioned over the spliced conductors. In this preferred embodiment of the invention, the joint case comprises an inner metal shell having a body region, 11, and a tapered end region, 12. The tapered end region, 12, consists of a series of prongs or fingers makng a smooth transition from the body region, 11, to the cable, 2. The body section is preferably coated with an adhering polymeric layer. A joint case of this type is described in above mentioned U.S. Pat. No. 4,282,397.

The armor, 4, and the tapered end region, 12, of the metal shell of joint case, 10, are clamped to cylinder, 20, by first and second clamping means, 28 and 29, which are worm drive clamps such as conventional hose clamps. The armor, 4, and the joint case, 10, are clamped to the cylinder, 20, beyond protuberances, 22 and 23. The protuberances and mechanical strength to the installed clamp assembly as they prevent the clamped armor, 4 and joint case, 10, from being displaced from the clamping means, 28 and 29.

The entire joint area is covered with a protective layer, 30, which is a dimensionally-recovered polymeric sleeve. Such a sleeve is installed by positioning a recoverable sleeve over the entire area and then causing the sleeve to recover into intimate contact with the joint area. The sleeve is coated with an adhesive and is bonded to the underlying cable and joint area. In the illustrated embodiment, the sleeve, 30, is sealed to the center raised portion, 21, of metal cylinder, 20. The seal to the raised portion of the cylinder further insures that moisture will not penetrate into the joint area. In particular, it prevents water wicking along the armor wires, 4, from seeping into the joint area.

In the drawing, for purposes of illustration, the joint case, 10, is enclosed by the polymeric sleeve. In a preferred embodiment, utilizing the joint case described in U.S. Pat. No. 4,282,397 the metal shell of the joint case has an adherent polymer layer or coating. In using such a splice case, a polymeric heat-recoverable sleeve can be used as above, enclosing the entire joint area. Alternatively, a pair of shorter sleeves can be used, each extending from the polymer coated body region of the joint case over the adjacent tapered end region, the clamping assembly of this invention and the outer sheath of the cable.

While the instant invention has been described primarily by reference to the preferred, it is understood that there are other areas which would generally function in the same manner and are considered to be within the scope of this invention. The above preferred embodiment thereof should be considered as illustrative and not restrictive, the scope of the invention being limited solely to the appended claims and all equivalents thereto.

What is claimed is:

1. An assembly for connecting the metal armor, screen or shielding of a power cable to a metal bridging element which spans a joint between the power cable and at least one other power cable, the power cable comprising a core, a sheath surrounding said core, metal armor, screen or shielding surrounding the sheath and an outer insulating layer; said assembly comprising:
   (a) a hollow metal cylinder having two end portions and a center portion, said cylinder having an internal diameter greater than the diameter of said cable, said center portion having an outer diameter greater than the outer diameter of said end portions, and said cylinder being of a length insufficient to span the joint;
   (b) means for sealing one end portion of said cylinder to the sheath surrounding the core of said cable;
   (c) a first clamping means for securing the metal armor, screen or shielding to one of said end portions of said cylinder; and
   (d) a second clamping means for securing one end of said metal bridging element to the other of said end portions of said cylinder.

2. The assembly in accordance with claim 1, wherein said cylinder is of steel.

3. The assembly in accordance with claim 1, wherein said cylinder is of galvanized steel.

4. The assembly in accordance with claim 1, wherein said sealing means is a polymeric sleeve bonded to said cylinder and said cable sheath.

5. The assembly in accordance with claim 4, wherein said polymeric sleeve is a dimensionally recovered polymeric sleeve which has been installed by placing a dimensionally recoverable sleeve over said cylinder and cable sheath and causing said sleeve to dimensionally recover into intimate contact with said cylinder and sheath.

6. The assembly in accordance with claim 5, wherein said polymeric sleeve is a heat-recovered polymeric sleeve.

7. The assembly in accordance with claim 6, wherein said sleeve is coated on the inner surface thereof with a heat activatable adhesive.

8. The assembly in accordance with claim 5, wherein said polymeric sleeve is of polyethylene.

9. The assembly in accordance with claim 5, wherein said polymeric sleeve is of cross-linked polyethylene.

10. A method for connecting the metal armor, screen or shielding of a power cable to a metal bridging element which spans a joint between the power cable and at least one other power cable, the power cable comprising a sheath surrounding said core, metal armor, screen or shielding surrounding the sheath and an outer insulating layer; said method comprising:
    (a) positioning over the end of said cable, a metal cylinder having two end portions and a center portion, said cylinder having an internal diameter greater than the said diameter of said cable, said center portion having an outer diameter greater than the outer diameter of said end portions, and said cylinder being of a length insufficient to span the joint;
    (b) sealing said cylinder to the sheath surrounding the core of said cable;
    (c) clamping said metal armor, screen or shielding to one of said end portions of said cylinder; and
    (d) clamping one end of said metal bridging element to the other of said end portions of said cylinder; the metal armor screen or shielding and said metal bridging elements being positioned such that they do not cover the center portion of said cylinder.

11. A method in accordance with claim 10, wherein said cylinder is of steel.

12. The method in accordance with claim 10, wherein said cylinder is of galvanized steel.

13. The method in accorance with claim 10, wherein said cylinder is sealed to said cable sheath by means of a polymeric sleeve.

14. The method in accordance with claim 13, wherein said polymeric sleeve is a dimensionally recovered polymeric sleeve which has been installed by placing a dimensionally recoverable sleeve over said cylinder and cable sheath and causing said sleeve to dimensionally recover into intimate contact with said cylinder and sheath.

15. The method in accordance with claim 14, wherein said polymeric sleeve is a heat-recovered polymeric sleeve.

16. The method in accordance with claim 15, wherein said sleeve is coated on the inner surface thereof with a heat-activatable adhesive.

17. The method in accordance with claim 14, wherein said polymeric sleeve is of polyethylene.

18. The method in accordance with claim 14, wherein said polymeric sleeve is of cross-linked polyethylene.

19. A method of protecting a joint between power cables, each said cable comprising an inner core surrounded by a sheath, metal armor, screen or shielding and an outer insulating layer, which comprises:

(a) positioning over the end of at least one of said cables, a metal cylinder having two end portions and a center portion, said cylinder having an internal diameter greater than the diameter of said cable and said center portion having an outer diameter greater than the outer diameter of said end portions;

(b) placing around the joint, a joint case having a continuous metal element extending the length of said joint case;

(c) sealing said cylinder to the sheath surrounding the core of said cable;

(d) clamping said metal armor, screen or shielding to one of said end portions of said cylinder, said metal armor, screen or shielding being positioned such that it does not cover said center portion of said cylinder;

(e) clamping one end of the metal element of said joint case to the other of said end portions of said cylinder, said metal element being positioned such that it does not cover said center portion of said cylinder;

(f) placing a dimensionally recoverable polymeric sleeve over at least a portion of said joint case, said metal cylinder and the end of said cable; and (g) causing the sleeve to recover into contact with and sealing to said joint case, the center portion of said cylinder and said cable.

20. The method in accordance with claim 19 wherein said cylinder is sealed to said sheath by:

(i) positioning a dimensionally recoverable polymeric sleeve over one end portion of said cylinder and said sheath, said sleeve being coated on the inside thereof with an adhesive, and (ii) causing said sleeve to dimensionally recover into intimate contact with said cylinder and said cable sheath and being sealed thereto by said adhesive.

21. The method in accordance with claim 20, wherein said polymeric sleeve is a heat-recoverable sleeve and said sleeve is dimensionally recovered by applying heat to said sleeve.

22. A method of connecting the armor wires and metal sheath of a paper insulated power cable to the metal armor, screen or shielding of another power cable jointed to said paper insulated cable, said paper insulated cable comprising a core having a plurality of conductors insulated from each other from oil impregnated paper, a metal sheath surrounding said core and armor wires surrounding said sheath, and an outer insulating layer, which method comprises:

(a) displacing the armor from the end of said paper-insulated cable to expose the underlying metal sheath;

(b) placing a unitary metal cylinder over the metal sheath at the end of said cable;

(c) placing a dimensionally-recoverable sleeve over one end of said cylinder and the adjacent metal sheath of the cable; said sleeve having a coating of sealant on the inner surface thereof;

(d) causing said sleeve to dimensionally recover into contact with said cylinder and metal sheath and to be sealed thereto;

(e) clamping the armor wires of the said cable to one of said end portions of said cylinders;

(f) clamping one end of a metal bridging element to the other end portion of said cylinder; and (g) connecting the other end of said metal bridging element to the metal armor, screen or shielding of said other power cable.

* * * * *

UNITED STATES PATENT AND TRADEMARK OFFICE
CERTIFICATE OF CORRECTION

PATENT NO. : 4,518,819

DATED : May 21, 1985

INVENTOR(S) : PETER LARSSON and ROBIN CLABBURN

It is certified that error appears in the above-identified patent and that said Letters Patent are hereby corrected as shown below:

Col. 2, line 37, after Fritsche, Delete "5"

Signed and Sealed this

Fourth Day of November, 1986

[SEAL]

*Attest:*

DONALD J. QUIGG

*Attesting Officer*     *Commissioner of Patents and Trademarks*